(12) United States Patent
Ollikainen (10) Patent No.: US 11,695,838 B2
(45) Date of Patent: Jul. 4, 2023

(54) METHOD, COMPUTING UNIT AND SYSTEM FOR TOKEN-BASED INFORMATION EXCHANGE

(71) Applicant: Teknologian Tutkimuskeskus VTT Oy, Espoo (FI)

(72) Inventor: Ville Ollikainen, Vtt (FI)

(73) Assignee: TEKNOLOGIAN TUTKIMUSKESKUS VTT OY, Espoo (FI)

( * ) Notice: Subject to any disclaimer, the term of this patent is extended or adjusted under 35 U.S.C. 154(b) by 863 days.

(21) Appl. No.: 16/487,112

(22) PCT Filed: Oct. 16, 2017

(86) PCT No.: PCT/FI2017/050722
§ 371 (c)(1),
(2) Date: Aug. 20, 2019

(87) PCT Pub. No.: WO2018/150081
PCT Pub. Date: Aug. 23, 2018

(65) Prior Publication Data
US 2021/0142124 A1 May 13, 2021

(30) Foreign Application Priority Data
Feb. 20, 2017 (FI) ..................................... 20175154

(51) Int. Cl.
*G06F 21/00* (2013.01)
*H04L 67/306* (2022.01)
(Continued)

(52) U.S. Cl.
CPC ............ *H04L 67/306* (2013.01); *G06F 18/22* (2023.01); *G06F 18/23213* (2023.01);
(Continued)

(58) Field of Classification Search
CPC ... G06F 21/33; G06F 21/6218; G06K 9/6272; G06K 9/6215; G06K 9/6223
See application file for complete search history.

(56) References Cited

U.S. PATENT DOCUMENTS

10,410,125 B1 * 9/2019 Finkelstein ............. G06F 16/35
2014/0059213 A1 2/2014 Ollikainen et al.
(Continued)

*Primary Examiner* — Joseph P Hirl
*Assistant Examiner* — Chi D Nguy
(74) *Attorney, Agent, or Firm* — Merchant & Gould P.C.

(57) ABSTRACT

A method, a computing unit and a system for token-based information exchange between a computing unit of a first entity (400A) and a computing unit of one second entity (400B) are presented. The method comprises obtaining (110) a token set (200A) associated with the first entity (400A) and a token set (200B) associated with the one second entity (400B), clustering (120) the token set (200A) associated with the first entity (400A) into clusters, requesting (130) information on tokens (205, 205A, 205B) from the computing unit of the one second entity (400B), receiving (140) information on said tokens (205, 205 A, 205B) from the computing unit of the one second entity (400B), determining (150) an active cluster associated with the first entity (400A), modifying (160) the token subset (310, 320) associated with the determined active cluster of the first entity (400A) at least partly with information on the received tokens (205, 205A, 205B) associated with the second entity (400B).

13 Claims, 7 Drawing Sheets

(51) Int. Cl.
 *G06F 21/33* (2013.01)
 *G06F 21/62* (2013.01)
 *G06F 18/2413* (2023.01)
 *G06F 18/22* (2023.01)
 *G06F 18/23213* (2023.01)

(52) U.S. Cl.
 CPC ........ *G06F 18/24137* (2023.01); *G06F 21/33* (2013.01); *G06F 21/6218* (2013.01)

(56) References Cited

U.S. PATENT DOCUMENTS

| | | | |
|---|---|---|---|
| 2015/0066591 A1* | 3/2015 | Chourey | H04L 67/22 |
| | | | 705/7.29 |
| 2015/0319162 A1 | 11/2015 | Ollikainen et al. | |
| 2015/0358165 A1* | 12/2015 | Ollikainen | G06F 16/90324 |
| | | | 726/9 |
| 2018/0052849 A1* | 2/2018 | Jagmohan | G06N 20/00 |

* cited by examiner

METHOD, COMPUTING UNIT AND SYSTEM FOR TOKEN-BASED INFORMATION EXCHANGE

PRIORITY

This application is a U.S. national application of the international application number PCT/FI2017/050722 filed on 16 Oct. 2017, which claims priority of Finnish application FI20175154 filed on Feb. 20, 2017, the contents of all of which are incorporated herein by reference.

TECHNICAL FIELD

The present invention relates in general the technical field of interacting between different entities with electronic computing capability. Particularly, however, not exclusively, the present invention concerns token-based information exchange between different entities with electronic computing capability.

BACKGROUND

A concept of ubiquitous computing means that multiple types of computing units are involved in everyday life and by communicating with each other enable highly sophisticated ways to improve life in general. The interaction between different types of computing units and/or entities enables not only providing ubiquitous services for users, but also gives some novel opportunities for systems which are learning from the behavior of the users. Such an opportunity may be used for e.g. so called recommendation systems based on collaborative filtering in which a user receives such information for his/her decision-making which is affected by other users' previous experiences. In order to enable the exchange of information between computing units and/or entities of the ubiquitous computing systems, there is a need to be set up information elements which can be utilized in information exchange. The same information elements can be used for providing highly sophisticated services so that the benefits of ubiquitous computing can be seen by the users.

An example of a utilization area related to such information elements can be, for example, the recommendation systems, which can be, e.g., services provided for mobile computing units. This is due to the fact that since the mobile computing units move around, it is also advantageous from user's point of view to receive recommendations relating to a context of the computing unit. Thus, one can say that recommendations have become essential in creating additional value for mobile service providers. Contexts play a focal role in understanding what the users of a mobile service want or need. Thus, understanding user's context and acting based upon it is of the utmost importance for a mobile service to be successful. On a more general approach, it can be said that there are numerous computational problems, the purpose of which is to predict the behavior of an entity, and for these problems several mathematical methods combined with the recommendation systems are superior. The mathematical methods need also to be used for understanding the context of a user and thus making better and better recommendations thereof.

In some known recommendation systems, information on user's context, such as daily routines, is being collected. By analyzing this history information, with e.g. position information, it is possible to deliver, by the service providers such as shops, recommendations to the user in an intelligent way. Information on the user's context is maintained in a network and context activity is periodically transmitted thereto.

WO 2012/113992 A1 presents an information exchange scheme between entities utilizing tokens, i.e., information tokens, and/or token sets. During an instance of information exchange, at least some of the tokens in the token set of the first entity are transmitted into the token set of the second entity, and vice versa. After the exchange of tokens, the token sets of the two entities resemble each other more compared to the initial situation before the exchange. The tokens may be utilized in a recommendation system for recommending a user with items or services based on the token set of the user which includes information about the past behavior of the user. WO 2014/029904 A1 presents a distributed recommendation system utilizing token-based information exchange.

In the attempted solutions, the tokens to be exchanged are typically selected by random. Also, when a token storage gets full, tokens are typically removed by random selection. These random selections cause two primary problems. Required amount of tokens exchanged in a single interaction is relatively high, 5-15% of all tokens in a token set. If a user of a recommendation system had several interest, respectively, say motorcycles and gardening, there is no difference between those tokens per se.

These two primary challenges in turn cause other challenges, such that tokens in a token set change too quickly. In other words, if the person in previous example spends some time with motorcycles, the proportion of tokens related to gardening gets quickly eroded. As another example, in a book recommender, tokens of a particular series of books change quickly, so after a while the particular book series gets significantly less recommendations because its tokens quickly resemble none of the tokens sets it has been interacting with in the past, which means that the user, as far as recommendations are concerned, gets motorcycle recommendations when he/she would like to focus on gardening. Another challenge arises from the privacy aspect. The more tokens exchanged at a time, the more likely it is that the user can be detected by the tokens he/she provides.

SUMMARY

An objective of the invention is to provide a method, a computing unit and a system for token-based information exchange. Another objective of the invention is that the method, the computing unit and the system at least alleviate drawbacks associated with previous attempts, such as described hereinabove, such as related to quick erosion of the tokens associated to a particular area of interest or entity while at the same time enhancing user-privacy.

The objectives of the invention are reached by a method, a computing unit and a system as defined by the respective independent claims.

According to a first aspect, a method for token-based information exchange between a computing unit of a first entity and a computing unit of at least one second entity is provided. The method comprises:

obtaining a token set including at least one token, such as a binary number, associated with the first entity, such as at the computing unit of the first entity, and a token set including at least one token, such as a binary number, associated with the at least one second entity, such as at the computing unit of the second entity, wherein each entity is associated with at least one token set, clustering at least the token set associated with the first entity into at least two clusters, such as by bisecting k-means clustering, such as by the computing unit of the first entity, requesting information on one or several tokens associated with the at least one second entity from the computing unit of the at least one second entity, such as by the computing unit of the first entity, for forming at least two token subsets corresponding to said at least two clusters, receiving information on said one or several tokens from the computing unit of the at least one second entity, such as at the computing unit of the first entity, determining an active cluster associated with the first entity, such as at the computing unit of the first entity, and modifying the token subset associated with the determined active cluster of the first entity at least partly with information on the received one or several tokens associated with the second entity, such as by the computing unit of the first entity.

The clustering may further comprise clustering the token set associated with the at least one second entity for forming at least two token subsets corresponding to the clusters associated with the at least one second entity.

The determining may comprise determining the active cluster based on the received information on said one or several tokens or based on the previously determined active cluster.

The receiving may comprise receiving information on said one or several tokens from a primary cluster associated with the at least one second entity.

The primary cluster may be the cluster comprising the most tokens or being the previously utilized cluster or being the cluster with highest density.

The clustering may comprise calculating mean value(s), standard deviation(s) and linear correlation(s) of the token set(s) or subset(s), such as linear regression(s).

The clustering may comprise selecting the closest tokens as seed centroids for clustering, wherein the seed centroids are the closest tokens to points on a linear correlation line of the linear correlation, having distance equal to the standard deviation from the mean value, wherein the seed centroids are selected from the different sides of the linear correlation line.

The method may comprise determining an inactivity period, obtaining a no-action token set including at least one token associated with the at least one second entity, storing said information on said one or several tokens in connection with the at least one second entity, detecting occurrence of the inactivity period during which no token-based information exchange between the computing units of the first and at least one second entities has taken place after said requesting information on said one or several tokens, and modifying the no-action token set associated with the at least one second entity at least partly with stored information on the received one or several tokens associated with the second entity.

The inactivity period may be determined to be a fixed duration, or a statistical value based on all observed inactivity periods of a particular entity, such as a user or an item, or on observed inactivity periods of all entities.

The method may comprise sending information on one or several tokens in response to the requesting depending on a status of the first entity, wherein a stored information on previously sent information on said one or several tokens is being utilized in the sending of said information.

The status of the first entity may be anonymous or registered.

The sending may comprise sending different information on one or several tokens with respect to the stored information on previously sent information on said one or several tokens in case the status of the entity is anonymous.

The sending may comprise sending the same information on one or several tokens with respect to the stored information on previously sent information on said one or several tokens in case the status of the entity is registered.

According to a second aspect, a computing unit for token-based information exchange with at least one other computing unit of at least one second entity is provided. The computing unit comprises communication means for exchanging information with at least one other computing unit, memory unit for storing portions of computer code containing instructions to be executed by a processing unit, and wherein the processing unit is configured to:

obtain a token set including at least one token, such as a binary number, associated with the first entity and a token set including at least one token, such as a binary number, associated with the at least one second entity, wherein each entity is associated with at least one token set, cluster at least the token set associated with the first entity into at least two clusters, such as by bisecting k-means clustering, for forming at least two token subsets corresponding to said at least two cluster, request information on one or several tokens associated with the at least one second entity from the computing unit of the at least one second entity, receive information on said one or several tokens from the computing unit of the at least one second entity, determine an active cluster associated with the first entity, modify the token subset associated with the determined active cluster of the first entity at least partly with information on the received one or several tokens associated with the second entity.

According to a third aspect, a system comprising a computing unit of a first entity, a computing unit of at least one second entity, the computing units are configured to exchange information utilizing tokens, is provided. In the system token sets are configured to be obtained by said computing units for associating with said entities, each of said token sets are configured to be clustered into at least two clusters, such as by bisecting k-means clustering, for forming at least two token subsets corresponding to said at least two cluster, information on one or several tokens associated to the at least one second entity from the computing unit of the at least one second entity is configured to be requested, information on the token from the computing unit of the at least one second entity is configured to be received, one of the clusters of the first entity is configured to be determined as an active cluster, the token subset associated with the active cluster of to the first entity at least partly with information of the received token associated to the at least one second entity are configured to be modified, and the modified token subset is configured to be utilized in a service, such as related to a recommendation system or a business intelligence system.

According to a fourth aspect, a method for token-based information exchange between a computing unit of a first entity and a computing unit of at least one second entity is provided. The method comprises:

determining an inactivity period, obtaining a token set including at least one token, such as a binary number, associated with the first entity, and a token set including at least one token, such as a binary number, associated with the at least one second entity, and a no-action token set including at least one token associated with the at least one second entity, wherein each entity is associated with at least one token set, requesting information on one or several tokens associated with the at least one second entity from the computing unit of the at least one second entity, receiving information on said one or several tokens from the computing unit of the at least one second entity, storing said information on said one or several tokens in connection with the at least one second entity, detecting occurrence of the inactivity period during which no token-based information exchange between the computing units of the first and at least one second entities has taken place after said requesting of information on said one or several tokens, and modifying the no-action token set associated with the at least one second entity at least partly with stored information on the received one or several tokens associated with the second entity.

According to a fifth aspect, a system comprising a computing unit of a first entity, a computing unit of at least one second entity is provided. The computing units of said entities are configured to exchange information utilizing tokens and in the system an inactivity period is configured to be determined by the computing unit of the at least one second entity, token sets are configured to be obtained by said computing units for associating with said entities and no-action token set is configured to be obtained by the computing unit of the at least one second entity, information on one or several tokens associated to the at least one second entity from the computing unit of the at least one second entity is configured to be requested, information on one or several tokens from the computing unit of the at least one second entity is configured to be received, said information on said one or several tokens is being stored in connection with the at least one second entity, occurrence of the inactivity period during which no token-based information exchange between the computing units of the first and at least one second entities has taken place after said requesting of information on said one or several tokens is configured to be detected, and the no-action token set associated with the at least one second entity is configured to be modified at least partly with stored information on the received one or several tokens associated with the second entity.

According to a sixth aspect, a method for token-based information exchange between a computing unit of a first entity and a computing unit of at least one second entity is provided. The method comprises:

obtaining a token set including at least one token, such as a binary number, associated with the first entity, and a token set including at least one token, such as a binary number, associated with the at least one second entity, wherein each entity is associated with at least one token set, requesting information on one or several tokens associated with the at least one second entity from the computing unit of the at least one second entity, receiving information on said one or several tokens from the computing unit of the at least one second entity, and sending information on one or several tokens in response to the requesting depending on a status of the first entity, wherein a stored information on previously sent information on said one or several tokens is being utilized in the sending of said information.

The status of the first entity may be anonymous or registered.

The sending may comprise sending different information on one or several tokens with respect to the stored information on previously sent information on said one or several tokens in case the status of the entity is anonymous.

The sending may comprise sending the same information on one or several tokens with respect to the stored information on previously sent information on said one or several tokens in case the status of the entity is registered.

According to a seventh aspect, a system comprising a computing unit of a first entity, a computing unit of at least one second entity is provided. The computing units of said entities are configured to exchange information utilizing tokens. In the system token sets are configured to be obtained by said computing units for associating with said entities, information on one or several tokens associated to the at least one second entity from the computing unit of the at least one second entity is configured to be requested, information on the token from the computing unit of the at least one second entity is configured to be received, information on one or several tokens in response to the requesting depending on a status of the first entity is configured to be sent, wherein a stored information on previously sent information on said one or several tokens is being utilized in the sending of said information.

The utility of the present invention arises from a variety of factors depending on each particular embodiment in question. The amount of exchanged tokens during an information exchange period are reduced significantly with respect to previously attempted solutions without compromising the quality of the recommendation that is based on the suggested token-based type of solution. The reduction in the amount of tokens exchanged during information exchange event at least alleviates challenges mentioned hereinabove, such as tokens associated with a particular entity, such as a user or an item, eroding too quickly. As an additional benefit, the clusters related to the token sets of a user are likely to resemble to different users under a shared user account, whenever the users have different behavior.

The terms "first", "second", "third", "fourth", "fifth", "sixth" and "seventh" do not denote any order, quantity, or importance, but rather are used to distinguish one element from another.

The exemplary embodiments of the invention presented in this patent application are not to be interpreted to pose limitations to the applicability of the appended claims. The verb "to comprise" is used in this patent application as an open limitation that does not exclude the existence of also un-recited features. The features recited in depending claims are mutually freely combinable unless otherwise explicitly stated.

The novel features which are considered as characteristic of the invention are set forth in particular in the appended claims. The invention itself, however, both as to its construction and its method of operation, together with additional objectives and advantages thereof, will be best understood from the following description of specific embodiments when read in connection with the accompanying drawings.

BRIEF DESCRIPTION OF FIGURES

The embodiments of the invention are illustrated by way of example, however, not by way of limitation, in the figures of the accompanying drawings which are briefly described in the following.

DESCRIPTION OF SOME EMBODIMENTS

Figure 1:
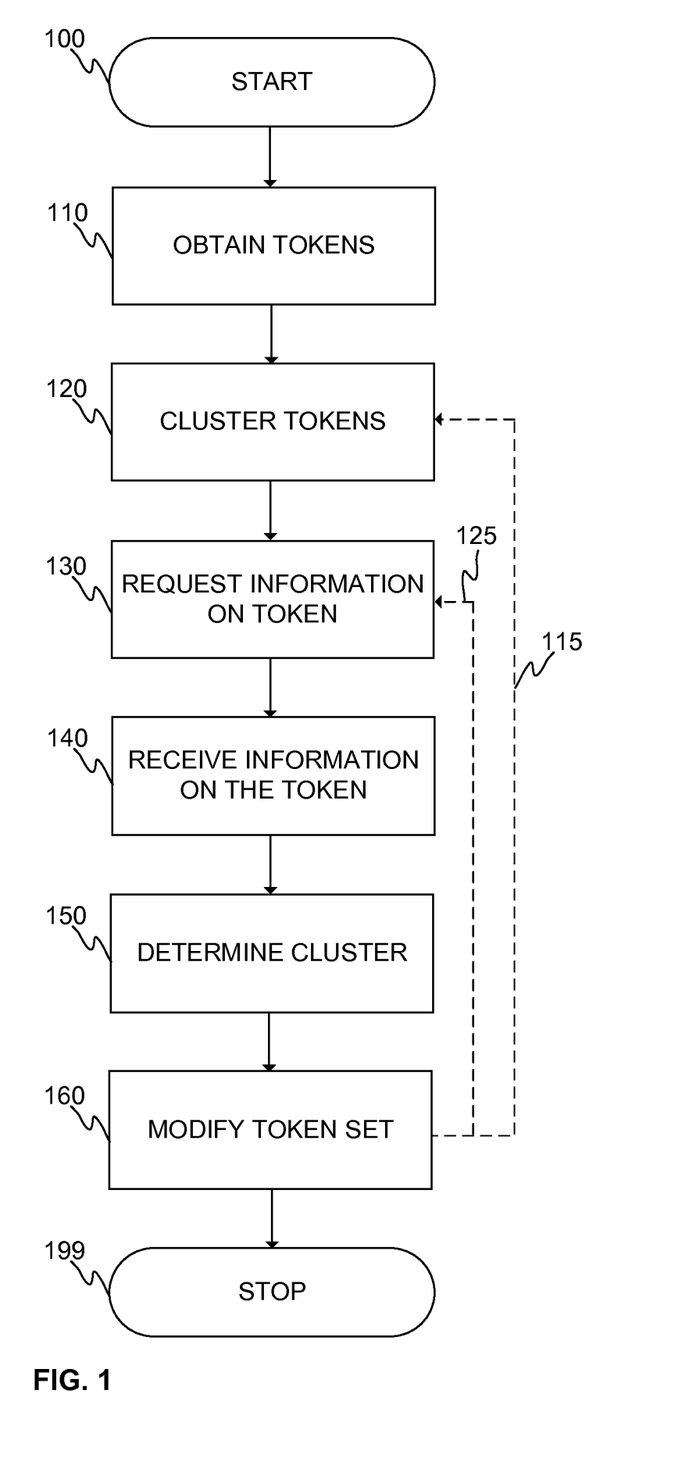
FIG. 1 illustrates a flow diagram of a method in accordance with an embodiment of the present invention.

FIG. 1 illustrates a flow diagram of a method according to an embodiment of the present invention. At 100, referring to a start-up phase, the necessary hardware, such as computing units, and software may be obtained, as well as tasks, such as, setting up communication between computing units, configuring networks, setting up servers, etc. may be performed, whichever of these may be necessary according to the specific embodiment to be implemented. Specific care must be taken that the individual elements and units work together in communication with each other, if necessary.

At 110, tokens or token set(s) may be obtained and associated with a first and at least one second entity. The obtaining may refer to initialization of the tokens or token sets for the entities in question, or the generation of tokens may performed by computing units of the entities. The tokens may, preferably, be binary numbers, such as, 24-bit binary numbers. There may be one or more tokens in a token set or sets associated with an entity.

With regard to the obtaining of the token set(s) associated with a first entity, such as a user or his/her user account, of a terminal device, a first token set, i.e. information defining the token set(s) at least in a level of detail which suffices for the execution of the remaining method items as represented herein may be obtained. Depending on the device or devices executing the method, such as a terminal and/or a server, device(s) may themselves maintain, or "host", (the information defining) token set(s) or alternatively, at least one functionally connectable remote entity, such as a Web service operated by at least one server, may be configured to store (the information defining) the set(s) for retrieval and use.

At 120, clustering at least one, such as the set associated with the first entity, or, preferably, each of said token sets into at least two clusters, such as by bisecting k-means clustering, may take place. Each entity may be associated with at least two clusters. One of the at least two clusters may be designated as a primary cluster. The primary cluster may, preferably, be the biggest cluster with respect to the amount of tokens comprised in said cluster.

The clustering according to an embodiment of the present invention may be performed by utilizing "bisecting k-means clustering" method. The clustering may advantageously be performed so that the token set is clustered first into two halves. This may be performed by selecting two seed centroids, preferably two tokens, in random, and thus the token set is divided into two halves, i.e., two clusters. Bisecting may continue further by dividing the tokens of at least one of the clusters into two sub-clusters, and so forth.

The selection of seed centroids may be performed as follows. It may be advantageous to calculate linear correlation, such as linear regression, of tokens in a token set, mean value and standard deviation. The seed centroids may then be the tokens which are closest to the distance equal to the standard deviation from the mean value, that is, the mean value plus the standard deviation and the mean value minus the standard deviation. The seed centroids then form the basis for the clustering.

At 130, requesting of information on a token associated with the at least one second entity from the computing unit of the at least one second entity may be performed. Based on the request, the computing unit of the second entity will select or retrieve a token or tokens, preferably, from its primary cluster, which comprise most tokens or was utilized during previous information exchange. After that the selected token or tokens, or information related to the token or tokens, will be transmitted to the computing unit of the first entity.

At 140, receiving information on the token from the computing unit of the at least one second entity may be performed. The received information on the selected token or the token itself may be compared for similarity with any of the clusters of the first entity. The primary cluster, for example comprising most tokens, may be chosen for similarity detection or the previously used cluster, that is, the previous active cluster. The active cluster is the cluster that has been the target of the previous information exchange event, and the information about the last used cluster has been stored in memory for utilizing during the next exchange event.

It may be considered that the token sets may be thought to define a mathematical space, the characteristics of which depend on the properties of the token or tokens. For example, in case of a token being a 24-bit random number, the values of the tokens then define a 24-dimensional hypercube. Different 24-bit random number, that is, having total of $2^{24}$ possible values, reside at the corners of the hypercube. The similarity between token sets may be determined by determining the hamming distance between the values of tokens, i.e., the distance between two corners of the hypercube. The hamming distance refers to the amount of different bits between two tokens, that is, in the case of 3-bit values, (101) and (010) would have hamming distance of 3, (110) and (101) hamming distance of 2, and (100) and (110) hamming distance of 1. The examples are related to only 3-bit values for the sake of simplicity but the hamming distance may nevertheless be determined between any two n-bit binary numbers, such as 24-bit binary numbers.

At 150, determining a cluster, for example, the active cluster, associated with the first entity based on the received information on said one or several tokens may take place.

The determination of the cluster may be based on the similarity of the content of the received token or tokens associated with the at least one second entity. The similarity may be measured by various different metrics. Hamming distance between the received token or tokens and a selected token or tokens from different cluster may be determined. The hamming distance may be determined between a randomly selected token from a cluster and the received token, in case of which the determination of the hamming distance becomes simple. This may then be repeated for all clusters by randomly selecting a token from a cluster and comparing it to the received token for similarity. The cluster the token of which is the most similar with respect to the received token is the cluster having the shortest hamming distance between its token and the received token.

Furthermore, the similarity between several tokens or token sets may also be determined and analyzed. The tokens are first selected within one cluster, for example, randomly. The similarity or resemblance between the received tokens and the tokens of the first entity, i.e. between several tokens or token sets, may be determined by calculating several hamming distances between the tokens of different entities. The tokens of different entities may first be compared so as to establish pairs of tokens being most similar with respect to each other. Analyzing the hamming distances may then be performed, for example, by using statistical methods, such as, establishing a histogram of the determined plurality of hamming distances. The most similar cluster may then be determined by, for example, comparing the position of the highest peak of the histograms or by the cluster having the lowest average or median of the distances. Another example is to determine the similarity between tokens or token sets by calculating a weighted sum of the distance values to which the histogram is based on. The weighting factor for a distance value for utilizing in determining the weighted sum may be, for example, $\frac{1}{2}\hat{}D$ ($\frac{1}{2}^D$), where D is the distance value. The weighted sum WSUM may, therefore, be calculated as follows:

$$\text{WSUM} = \frac{1}{N} \sum_{D=1}^{D=N} \left[ \frac{n(D)}{2^D} \right]$$

where N is the total amount of distance values included in the histogram, e.g., between token or tokens of two clusters associated with different entities, n(D) is the amount of distances related to a distance value, and D is the distance value. Still another example may be to utilize Jaccard (similarity) index for determining the similarity between tokens or token (sub-)set(s).

The amount of tokens exchanged during an information exchange event may be, for example, some constant number of tokens, for example, 1, 5, 10, 100 or even thousands, depending on the implemented system and the number of tokens typically associated with one entity. The amount of tokens exchanged may also be a certain percentage of the tokens in the determined cluster, that is, for example, the cluster resembling or having highest similarity with respect to the received token or tokens. The percentage may be, for example, 1-5%, preferably 2-3% of the tokens in the cluster. The percentage may be, for example, approximately 1 or 2%. The percentage may as well be defined to be with respect to all tokens associated with an entity.

At 160, modifying the token subset associated with the cluster of the first entity which is the most similar to the received token from the primary cluster of the second entity may take place. Modifying the token subset associated with the first entity at least partly with information of the received token associated with the second entity may take place. By exchanging token or tokens between entities will make them resemble each other more after the exchange than before the exchange, that is, the similarity will have increased during the exchange. According to an embodiment, if the token subset already comprises a token identical to the received token from the primary cluster of the second entity, a new token is being generated having hamming distance of one with respect to the received token. In case of tokens being 24-bit binary numbers, this will entail changing one bit in order to obtain a token having hamming distance of one with respect to the received token, that is, modifying one bit of the received token, preferably selected by random, thus placing the modified token into a neighboring corner of the hypercube defined by the tokens with respect to the original received token. In case of clustering of tokens, the above-mentioned token modification has a tendency of increasing the cluster in question and its density, because neighboring corners are likely to belong to the same cluster. This process may be continued as long as necessary for obtaining a token not existing in the token subset in question. If all different possible tokens already exist in the token subset, the token as received may be incorporated as it is to the token subset.

At 199, the method execution is ended. The method may be executed continuously or in certain intervals, or on a request. The method may also be executed only once or only a few times.

After the modification of the token set associated with the first entity by the information comprised on the received token associated with the second entity, the method may continue, preferably, by clustering the tokens again for forming new at least two clusters as illustrated in FIG. 1 at 115. However, the method may also continue by maintaining the clusters as previously formed, thus changed by the modification of the token subset at 160, and requesting information on a token from another entity as can be seen in FIG. 1 at 125.

Figure 2A:
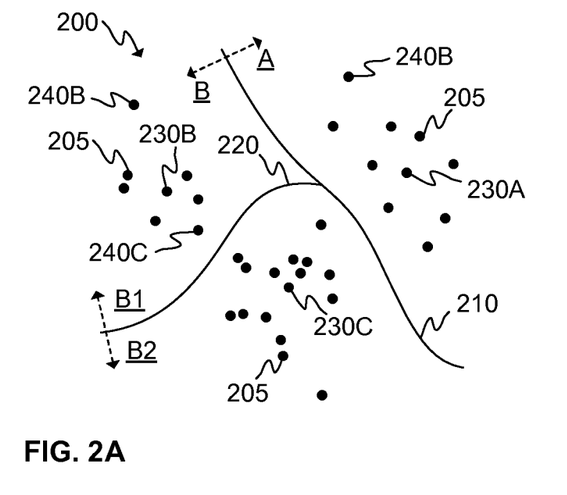
FIGS. 2A and 2B illustrate clustering of tokens according to some embodiments of the present invention.
Figure 2B:
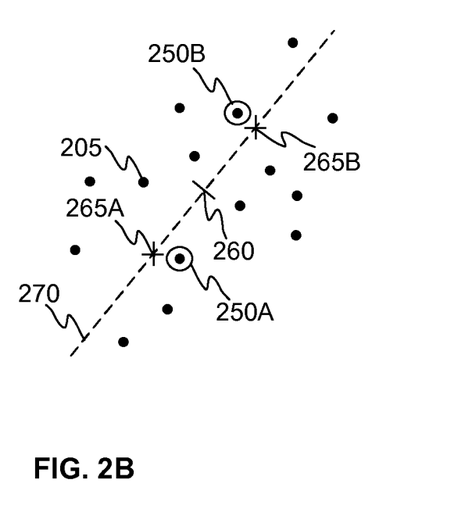
Figure 3:
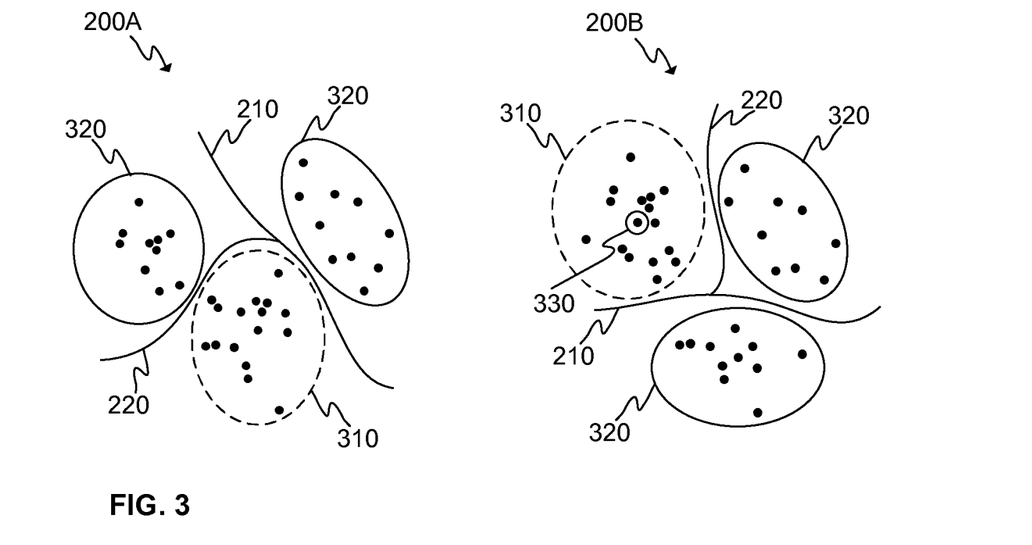
FIG. 3 illustrates clusters of tokens associated with different entities according to an embodiment of the present invention.

FIG. 2A illustrates clustering of tokens according to an embodiment of the present invention. The tokens 205 in the token set 200, such as associated with the first entity or one of the at least second entities, are illustrated in FIGS. 2A, 2B and 3 as dots. This is merely an exemplary way to illustrate the tokens 205 and/or token set 200 on a two-dimensional (2D) plane. It should be noted that in case of tokens 205 being binary numbers, such as, 6-, 12-, or 24-bit binary numbers, the token set 200 may be modelled by, for example, a 24-dimensional binary hypercube, at the corners of which the different binary numbers reside. Thus, the tokens may be thought to mathematically define an n-dimensional space. In FIGS. 2A, 2B and 3, the token set(s) of an entity or entities are, however, illustrated simply on a 2D plane.

The clustering according to the present invention may be performed, for example, by bisecting k-means clustering method. The clustering is illustrated in FIG. 2A, and it may be performed as follows. First, the token set 200 is divided into two clusters. The first cluster resides on the first side A of the clustering curve 210 and the other cluster on the second side B of the clustering curve 210. It should be noted that although the clustering curves are illustrated as curves in FIG. 2A, they may be in the simple case straight lines. At this point, the clustering may be stopped, thus, ending at a situation in which there are only two clusters in the token set 200. One of the clusters may be designated as the primary cluster. In this particular example, the primary cluster may be the cluster residing on the second side B of the clustering curve 210, fulfilling the criteria of including the most tokens 205. However, the number of tokens may not be the criteria or may be only partly influencing the selection of the primary cluster. Other conditions may also be utilized in the clustering, such as, determining the amount of tokens with respect to the size of the subspace into which the tokens of the particular cluster are included in. The subspace herein refer to the different sides A, B with respect to the clustering curve 210 in FIGS. 2A and 3.

FIG. 2B illustrates clustering of tokens according to an embodiment of the present invention. The clustering is based on calculating linear correlation, such as linear regression, in this case yielding the linear regression line 270. Mean value 260 and standard deviation may, preferably, also be calculated. Two seed centroids 250A, 250B may then be selected for clustering by selecting two tokens which are closest to the points 265A, 265B having a distance equal to the standard deviation from the mean value. The seed centroids 250A, 250B may, advantageously, be selected on or close to the linear regression line 270 from different sides of the mean value 260, as shown in FIG. 2B.

According to an embodiment of the present invention, the clustering may continue such that one of the two subspaces A, B comprising the clusters may be divided again to form sub-clusters, i.e., dividing subspace B into sub-subspaces B1 and B2. This is illustrated by the second dividing curve 220 shown in FIG. 2A. The condition for further clustering may be, for example, the amount of tokens with respect to the subspaces in which the tokens belong to. By clustering the token set(s) further space with no tokens are being left outside, thus, increasing the "density" of the clusters.

The terms "(sub-)space" and "(sub-)cluster" as defined herein, differ from each other in that sense that the (sub-)space comprises essentially all possible variations of the tokens. It may be further explained in case of tokens being n-dimensional binary numbers such that the amount of possible binary number is $2^n$, i.e., two to the power of n. Cluster or sub-cluster, on the other hand, may be as large as space or sub-space, however, it may also be of different size and essentially defined only by the tokens in the cluster. This is further illustrated in FIG. 3 which shows that the cluster may still include "empty" points, i.e. not having tokens, but not extending to be as large as the subspace in question.

FIG. 3 illustrates clusters of tokens of different entities according to an embodiment of the present invention. FIG. 3 also illustrates the token sets 200A, 200B on a 2D plane for the sake of simplicity. In this case, the token set 200A of the first entity and the token set 200B of the second entity both are clustered into three clusters. This is merely an example of the clustering and it is to be understood that there may be after clustering any number of clusters more than one per token set. The primary clusters 310 are encircled with dashed lines. Other clusters are marked with solid lines. With reference to FIG. 1, the primary clusters 310 may be active cluster, however, this may also not be the case.

FIG. 3 illustrates also a part of the information exchange process, specifically, the requested token 330. The requested token 330 may be selected in different ways. One way is to select the token which is closest to a mean value calculated with respect all the tokens in a cluster, in this case the primary cluster 310. The exchange may involve one or several tokens, or the amount exchanged may be defined as a percentage of all tokens in one cluster or of all tokens associated with the entity.

Figure 4:
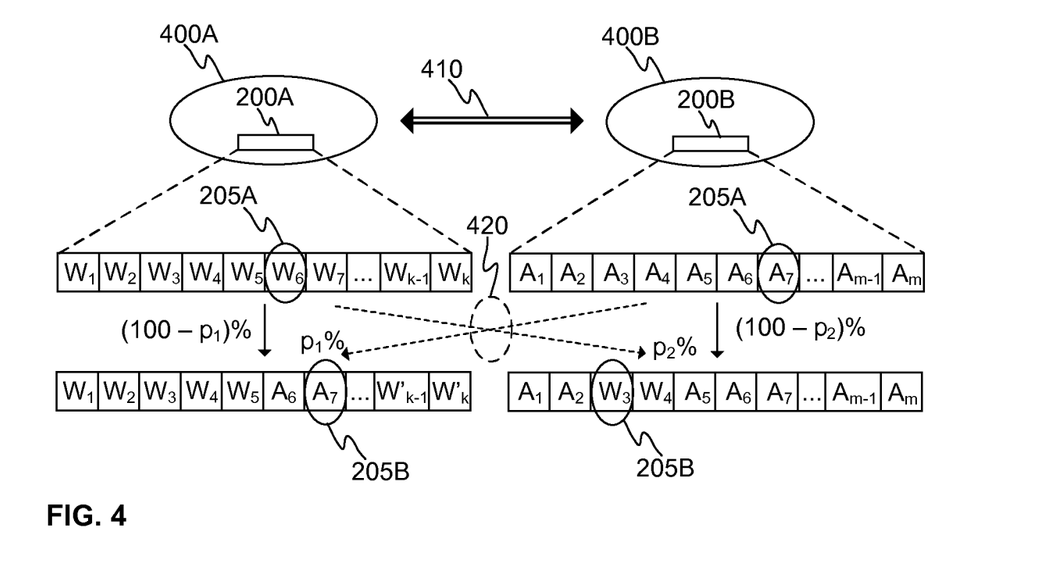
FIG. 4 illustrates a token-based information exchange according to an embodiment of the present invention.

FIG. 4 illustrates a token-based information exchange according to an embodiment of the present invention. The two entities 400A and 400B, preferably having computing capability, may be in communication 410 with each other for information exchange. The token-based information exchange event is illustrated in FIG. 4 with reference sign 420. The entities 400A, 400B are associated with token sets 200A, 200B, respectively. The token sets or subsets 200A, 200B comprise one or, preferably, several tokens 205A prior to the information exchange event. During the event 420, a certain amount of tokens 205 may be changed. The amount of tokens 205B after the exchange event 420 may be substantially similar or more than prior to the event. Whatever the number of tokens 205, the token sets or subsets 200A, 200B resemble each other more after the exchange event 420 compared to the situations prior to the exchange event 420. The numbers of tokens $p_1$, $p_2$ exchanged during the information exchange as shown in FIG. 4 are defined in this case as percentages of the total amount of tokens in the token set or subset 200A, 200B associated with the entities 400A, 400B.

According to an embodiment of the present invention, the seed centroids may be chosen by calculating a linear regression, and mean value and standard deviation with respect to the tokens. The first seed centroid for clustering is then chosen such that the token which is closest to mean value plus standard deviation will become one of the centroids. The second seed centroid for clustering will then be chosen such that the token which is closest to mean value minus standard deviation will become another of the centroids. The seed centroids may also be chosen randomly or by some other method, such as, based on selection of seed centroids and/or clusters during previous information exchange events.

After the clustering, there may be conditions for further sub-clustering of the clusters. These conditions may, in general, include a condition or a threshold related to the amount of tokens in a cluster. The threshold may be, for example, related to the density of the cluster, that is, the amount of tokens relative to the size of the cluster. The amount of tokens may simply be calculated and associated with an integer. The size of the cluster may be, for example, all possible different tokens in the cluster. As an example, in case of tokens being 24-bit binary numbers, the total amount of different possibilities, i.e. potential tokens, is two to the power of 24 ($2^{24}$). Alternatively, sparsity may be utilized as the threshold. The sparsity may be calculated essentially as a reciprocal of the density. The sub-clustering may be performed until the density of the cluster or sub-cluster exceeds the threshold. The threshold for the density may have values such as 10, 25 or 50%.

In a simple case considering 3-bit binary numbers as tokens, the clustering may be illustrated such that it could be based on the most significant bit. This would cluster the token set into two clusters, one having tokens (1,0,0), (1,0,1), (1,1,0), and (1,1,1), and the other having tokens (0,0,0), (0,0,1), (0,1,0) and (0,1,1). If there were only two tokens in the first-mentioned cluster, the density would be 50%. If there were three tokens in the second-mentioned cluster, the density would be 75%. However, it should be noted that the cluster may or may not include all possible binary numbers available, i.e. two to the power of three, in this case. The size of the cluster may also be based on the tokens in the cluster, thus, defining the size of the cluster to be smaller than all possible binary numbers having the particular amount of bits, in this case four.

The token-based information exchange according to various embodiments of the present invention may be utilized in various applications. The benefits of the token-based information exchange according to an embodiment of the present invention will now be further clarified by describing some ways of utilizing thereof. These may include, for example, recommendation systems or business intelligence systems. Recommendations systems may be utilized for recommending services or items to a user. The information of the user preferences may be collected by utilizing the information exchange in accordance with the present invention. The clusters as described hereinabove may correspond to different areas of interest of the user of the recommendation system. These may be, for example, gardening and motorcycling. However, it should be noted that, for example in case of a recommendation system, the information exchange may occur between two entities which may be a user and an item, two users, two items, for instance. The clusters associated with an item, such as a museum, may be, for example, different sections of the museum, such as exhibitions or showrooms, related to different eras, or at least the information related to these sections on the museum website, for instance. Because the information exchange is performed by selecting the tokens from particular cluster, the challenge of previous attempts known in the art related to quick erosion of tokens related to a certain area of interest is at least alleviated. This is due to smaller amount of tokens exchange during an information exchange event and also due to the fact that the clusters related to other areas of interest remain substantially intact during the information exchange from said particular cluster. The lower amount of exchanged tokens further facilitates user-privacy.

Another example of the utilization is business intelligence. The clusters may represent different users under a shared user account. All of the users may, and probably would, have different areas of interest. By utilizing the token-based information exchange according to the present invention, the behavior of different users may be identified and data may be associated with the correct user under the same user account.

After some time and information exchange events, a token set associated with an entity may have so many tokens that the entity may be unable to receive any new tokens to be associated with. In such a situation, some of the tokens in the token set may be deleted. An advantageous way of deleting may be such that first a cluster is determined and selected which has the least amount of tokens ("least significant cluster"). In FIG. 2A the least significant cluster is the cluster B1. The deleting of a token may then be performed by selecting a token that is farthest away from the center token 230A-230C of the cluster and then delete it, that is 240B in FIG. 2A. Alternatively, a token can be deleted from the least dense cluster, that is, in FIG. 2A cluster A, which is farthest away from the center token of the cluster. In FIG. 2A this would be token 240B. Still according to another alternative, a token from the least significant cluster, i.e., in this case cluster B1, may be deleted that is closest to another cluster, thus, separating the adjacent clusters further still, in FIG. 2A token 240C.

The token-based information exchange according to various embodiments of the present invention may be implemented in and by different kinds of arrangements or systems. These may include multiple electronic computing devices and corresponding systems of multiple interconnected devices. The computing devices may be communication network accessible electronic devices or arrangements which may include one or several servers, for instance, and may, optionally, reside in a cloud computing environment preferably accessible via the Internet. The computing units of different entities may then reside also physically in different locations, such as, on different mobile devices or servers. However, the token-based information exchange according to various embodiments of the present invention may also be implemented in a more standalone fashion or at least residing, for example, completely within one communication network or even within one system or a computing device. In this case, the computing units of different entities may in fact be configured within one computing device, thus, not requiring communication with external devices or systems. However, the solution may be also implemented by having several computing devices and/or units and/or, preferably, one or more servers in communication with each other.

Figure 5:
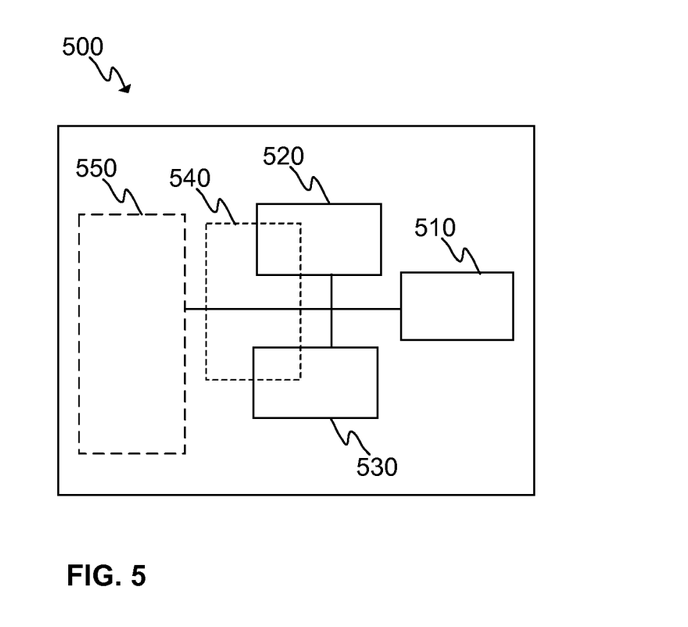
FIG. 5 illustrates a block diagram of a computing unit or device according to an embodiment of the present invention.

FIG. 5 illustrates a block diagram of an embodiment of, or at least part of, a computing unit 500 or device 500, or "computer" 500, for executing the method or at least selected items thereof. A computer program product embodied on a carrier medium, such as an optical disc or a memory card, comprising instructions (software 540) to carry out method items described herein, when run on a computer, may be provided. A number of different functional or logical entities may be formed by the software or other control logic and the underlying hardware. The computer, which may be included in (or be considered to be formed by) a terminal or a network server, for example, shall thus contain the necessary processing element(s) or unit(s) 520, such as microprocessor(s), signal processor(s) and/or microcontroller(s), and memory element(s) 530 such as memory chip(s) to process and store the instructions (and various other data), respectively. Yet, the computer shall include a communications interface 510 such as a wired or wireless transceiver for communicating with external entities, such as network(s) and/or terminal(s), and exchanging e.g. token data. Cellular, LAN (Local Area Network, e.g. Ethernet) or WLAN (Wireless LAN) communication may be enabled among other options. A user interface 550 may be provided for user-device interaction, i.e. receiving control input from the user and/or providing output to the user. Several such devices 500 may be functionally connected to establish a desired functional entity.

According to various embodiments of the present invention, the tokens, such as related to user(s) and/or item(s), is/are exchanged, for example, whenever a user performs an action with respect to an item, thus initiating a transaction or exchange of tokens. This may be the process as shown and described in connection with FIG. 1, for instance. According to an embodiment of the present invention, the methods, devices and/or systems may include obtaining, receiving or defining a token set associated with actions that are not taking place during a certain period of time, i.e. during an inactivity period. This token set is called herein a "no-action" token set. The inactivity period may refer, for example, to a time period during which a user or customer typically, e.g. on average, churns from an Internet site, such as, a web store selling items or services, after initiating the last information exchange. This means that during the inactivity period the user does not make any transactions or exchanges related to any item.

Figure 6:
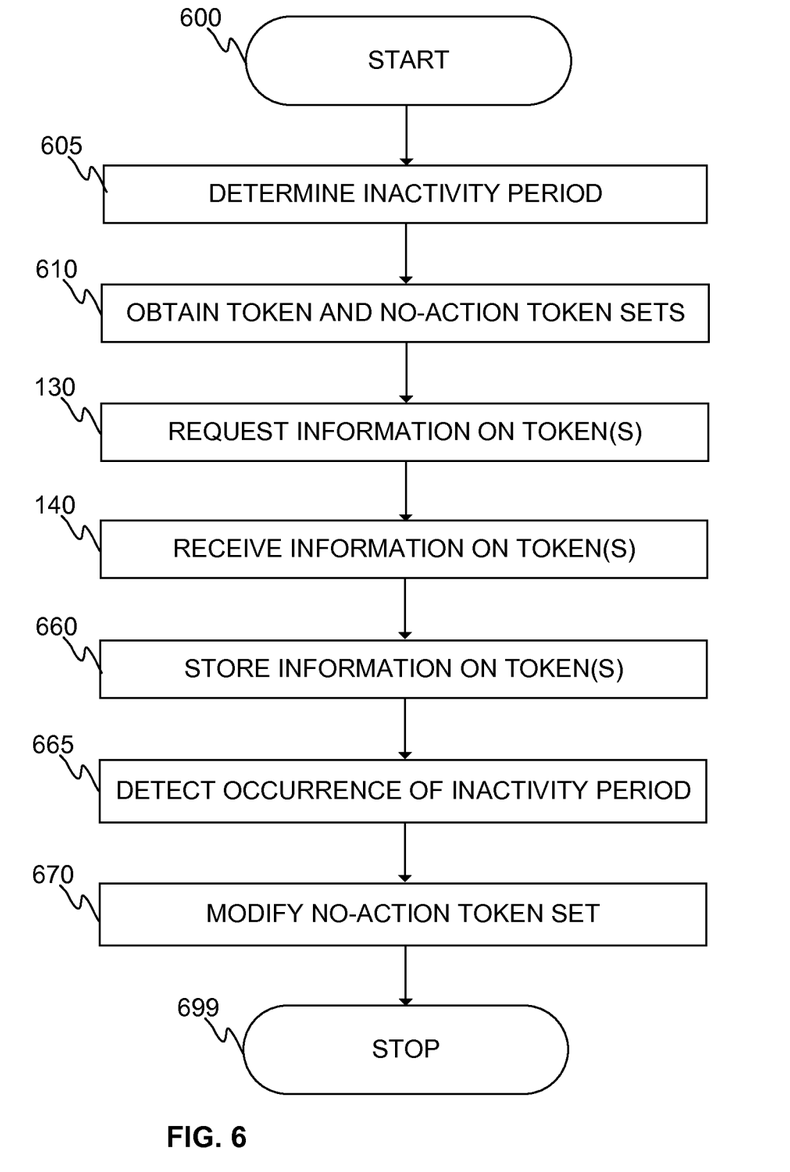
FIG. 6 illustrates a flow diagram of a method in accordance with an embodiment of the present invention.

Although described herein with respect to the exemplary embodiment of FIG. 1, it is to be understood that no-action token set(s), may be utilized in embodiments with or without clustering of the tokens and, therefore, with or without determining the active cluster. This is illustrated in FIG. 6

(described in more detail hereinlater) which depicts a flowchart of the method according to an embodiment of the present invention.

Implementation and utilization of the no-action token set may be done by configuring the system so as to store in memory the latest tokens sent to the user or entity, or advantageously to any item in a service. It should be understood, however, that the latest tokens may relate to tokens exchanged between a user and an item, or between users, or between items, for example. The inactivity period may be defined to be a certain time interval, e.g. a normal recurrence threshold, after which a "no-action event" may be triggered and the latest tokens provided by the user, or item, may be added to the no-action token set. This results the no-action token set to resemble with the token set(s) related to recent activities or exchanges performed or initiated by the user, or item.

As one application for big data, customer churn may be analyzed, attempting to detect customers that are about to churn and find reasons, why customers are churning, i.e., in the case of mobile operators, changing the service provider. Furthermore, since the token-based analysis enables finding similarities between different users or entities, between different items and between users and items, users whose token sets highest similarity with the no-action token set may be found, and/or items whose token sets highest similarity with the no-action token set may be found, enabling to detect users that are about to churn, and items that are most related to churn.

The normal recurrence threshold may be determined, for example, to be a fixed duration, however, a statistical value may advantageously be utilized instead. One example for the threshold may be 95% of all observed inactivity periods of a particular user which may be advantageous in detecting that the user is about to churn, for example due to the user getting fed up. Alternatively, the threshold may be defined to be 95% of observed inactivity periods of all users which may be advantageous to detect items that are related to churn, for example. As an example, the user may have only found a subset of all offerings, omitting something essential in shopkeeper's offerings, and thus visiting his site not too often. By detecting the pattern, that is, items related to which the user does and/or doesn't exchange tokens with, the shopkeeper may make other items more visible when the items related to churn, i.e. items that have most resemblance with no-action token sets, are presented. In order to detect the problem, the shopkeeper may also present the user a questionnaire, even a single question, about his or her user experience, such as what he or she was looking for, and add the requested products to the offerings.

FIG. 6 illustrates a flow diagram of a method according to an embodiment of the present invention. At 600, referring to a start-up phase, the necessary hardware, such as computing units, and software may be obtained, as well as tasks, such as, setting up communication between computing units, configuring networks, setting up servers, etc. may be performed, whichever of these may be necessary according to the specific embodiment to be implemented. Specific care must be taken that the individual elements and units work together in communication with each other, if necessary.

At 605, inactivity period, or the normal recurrence threshold, may be determined or defined. This may be done by defining a fixed duration or based on statistical value as explained hereinearlier.

At 610, tokens or token set(s) may be obtained and associated with a first and at least one second entity. The obtaining may refer to initialization of the tokens or token sets for the entities in question, or the generation of tokens may performed by computing units of the entities. The tokens may, preferably, be binary numbers, such as, 24-bit binary numbers. There may be one or more tokens in a token set or sets associated with an entity. This step may be similar to step 110 illustrated in FIG. 1, however, at 610, a no-action token set associated with at least one entity may further be obtained.

At 630, requesting of information on a token associated with the at least one second entity from the computing unit of the at least one second entity may be performed. Based on the request, the computing unit of the second entity will select or retrieve a token or tokens. After this, the selected token or tokens, or information related to the token or tokens, will be transmitted or sent to the computing unit of the first entity.

At 640, receiving information on the token from the computing unit of the at least one second entity may be performed.

At 660, storing the information on said one or several tokens transmitted or sent from the at least one second entity to the first entity in connection with the at least one second entity, such as to a memory element or component, may take place. These tokens may be stored as "the latest tokens sent".

At 665, detecting of occurrence of inactivity period during which no token-based information exchange between the computing units of the first and at least one second entities has taken place after said requesting of information on said one or several tokens may take place. This may be implemented, for example, by having a timer or a counter at or in connection with the computing unit of the second entity which measures the time that has passed after the last information exchange with the first entity, for instance, after step 630. If said time exceeds the determined inactivity period, or normal recurrence threshold, then inactivity is being detected.

At 670, modifying the no-action token set associated with the at least one second entity 400B at least partly with stored information on the received one or several tokens 205, 205A, 205B associated with the second entity 400B may take place.

At 699, the method execution is ended. The method may be executed continuously or in certain intervals, or on a request. The method may also be executed only once or only a few times.

One application for using no-action tokens is detecting a customer returning to the service. Returning customers may be detected quite reliably by explicit logins or unique email advertising campaign URL's (Uniform Resource Locator), or less reliably by cookies, IP (Internet Protocol) addresses and/or device fingerprinting. If returning customers can't be reliably detected, e.g. because of expiring or deleted cookies, it would be advantageous to trigger "no-action" when a user is returning, and her inactivity has exceeded the threshold; even though the customer is returning, a longish inactivity period can be interpreted as the user finding the service less engaging as it used to be.

In another embodiment, there may be several no-action triggers with different thresholds, i.e. for initiating the token exchange related to the no-action token set. For instance, a first trigger may be launched after the inactivity period exceeds user's average inactivity period plus twice the respective standard deviation. A second trigger may be launched after the inactivity period exceeds the inactivity period plus five times the respective standard deviation. A third trigger may be launched after the inactivity period exceeds 99% of inactivity periods of all users, indicating that the user is gone for good.

According to an embodiment of the present invention utilizing no-action token sets, each item may be further be associated with a tag or a set of tags. In a transaction or information exchange, tokens may be exchanged between the user and the tags associated with the item in addition or instead of the tokens of the particular item.

As an example of the utilization of tag or tags, there may be several no-action token sets associated with inactivity periods of different items or group of items. For instance, a user of a web news service may have read domestic, culture and sports news on regular basis, but recently started to read only domestic and sports news. This would trigger no-action token set of culture news. Thus issues may be detected in culture section of the service by utilizing tags "domestic", "culture" and "sports" related to corresponding items or group of items.

In another embodiment of the present invention, the token sets of at least some users or entities may be available at the time of triggering the exchange event concerning the no-action token set of the users. In this case, the latest tokens received from those users do not necessarily have to be stored in memory, but instead, a direct token exchange between the token sets of the user and no-action token set may be engaged. In this case, the token exchange is advantageously bidirectional; a normal token exchange that is.

The utilization of the no-action tokens provides means to respond to some of the most common needs in customer analysis. While in general, the token-based information exchange method and related devices and system may be used for providing recommendations for users, the use of no-action tokens expands the method and systems to be used also or only for customer analytics. For example, the service provider, an online shopkeeper for instance, may use the token-based information to find potentially adverse items, which have the closest match to no-action token sets. The shopkeeper may then make or order a further analysis regarding the reasons why a potentially adverse item correlates with reduced user activity. Alternatively or in addition, the shopkeeper may promote other items to a user when she is accessing a potentially adverse item. Alternatively or in addition, the shopkeeper may suggest a user to participate a survey when accessing a potentially adverse item, aiming at finding the problem in the service. Alternatively or in addition, the shopkeeper may provide the user premium treatment, such as a discount, when she is accessing a potentially adverse item, in order to maintain customer loyalty.

Figure 7:
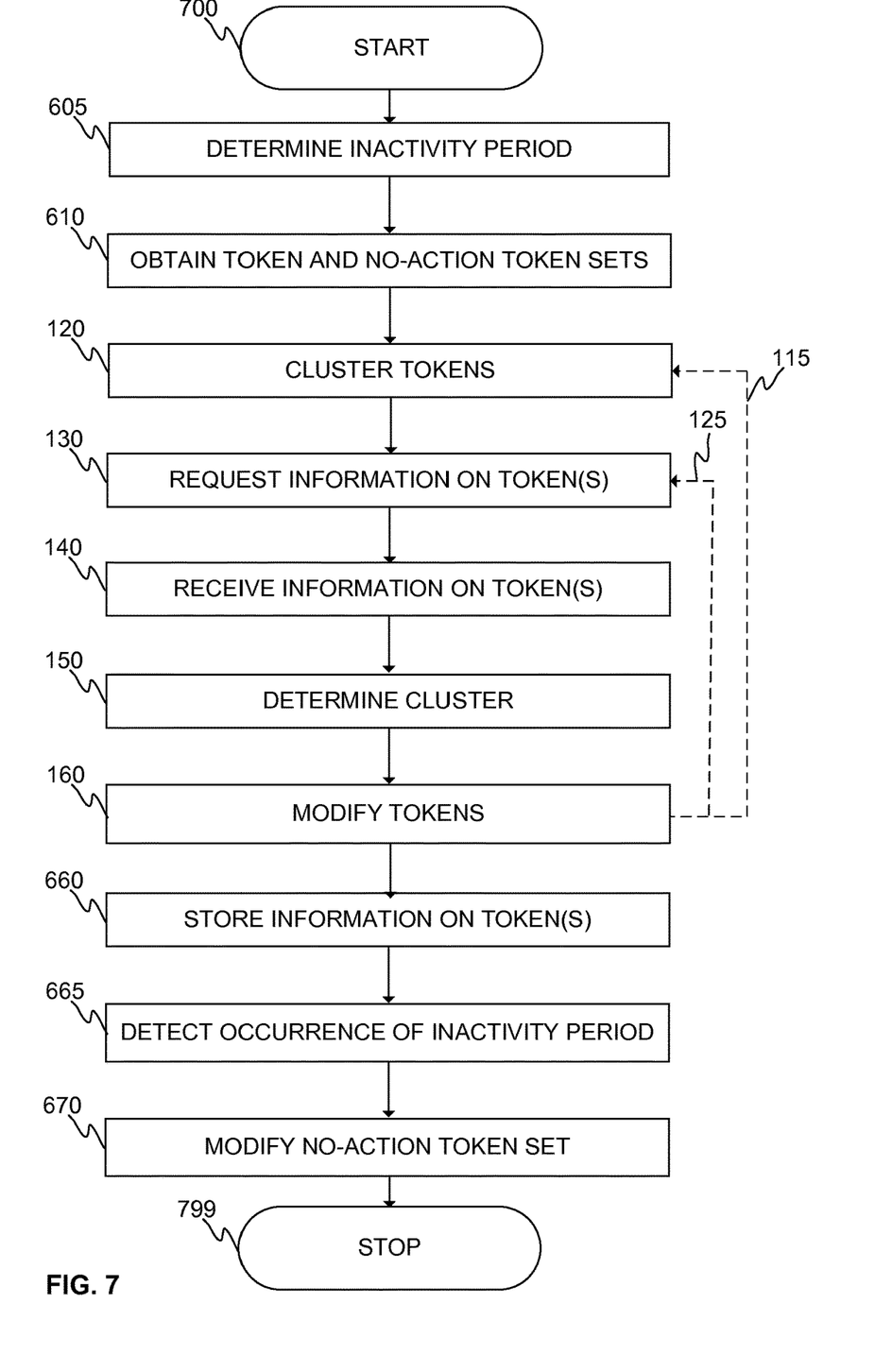
FIG. 7 illustrates a flow diagram of a method in accordance with an embodiment of the present invention utilizing clustering of tokens.

FIG. 7 illustrates a flow diagram of a method according to an embodiment of the present invention. At 700, referring to a start-up phase, the necessary hardware, such as computing units, and software may be obtained, as well as tasks, such as, setting up communication between computing units, configuring networks, setting up servers, etc. may be performed, whichever of these may be necessary according to the specific embodiment to be implemented. Specific care must be taken that the individual elements and units work together in communication with each other, if necessary.

Steps 605 and 610 are as described hereinearlier with respect to FIG. 6. Steps 115, 120, 125, 130, 140, 150 and 160 may be essentially similar as described hereinearlier with respect to FIG. 1. According to an embodiment, the clustering, at 120, may also be done for the tokens of the at least one second entity. Furthermore, steps 660, 665 and 670 are as described hereinearlier with respect to FIG. 6.

At 799, the method execution is ended. The method may be executed continuously or in certain intervals, or on a request. The method may also be executed only once or only a few times.

According to an embodiment, the stored information at 660 may be, in case of clustering of the tokens, information regarding one or more tokens of the chosen from the active cluster of the second entity.

By utilizing the token-based information exchange according to various embodiments of the present invention described hereinabove, the privacy of users may greatly be increased with respect to earlier known attempts. However, some adverse actions may still be possible, such as, tracking anonymous users, attempting to detect when they are returning, and/or monitoring development of the user's token stack, enabling further adverse analysis. In these respects, privacy may be compromised, for example, whenever a user discloses his or her tokens to the opposite side. As an example, the tokens may be disclosed in two occasions in the process, namely, during a transaction, for instance when a user has accessed an online news article, both sides provide tokens to the opposite side, and when requesting recommendations, the user advantageously discloses all her tokens in order to have the opposite side searching for the best matching items which may lead to a service tracking of the user's token stack by keeping record of the tokens during several information exchange processes.

In order to improve the privacy of the systems and methods according to the various embodiments of the present invention, still another embodiment of the present invention is disclosed according to which a user or an item, or rather the computing unit of the entity thereof, stores in memory information regarding which tokens has been disclosed to each user, item and/or service, for example. The token-based information system may then be configured to avoid disclosing same tokens twice, if anonymity of the user or the item is to be preserved. Furthermore, if clustering of the tokens is used, the user may provide or disclose only one token from the active cluster, one that at the first visit represents best the characteristics of the active cluster, second best at the second time and so forth.

Figure 8:
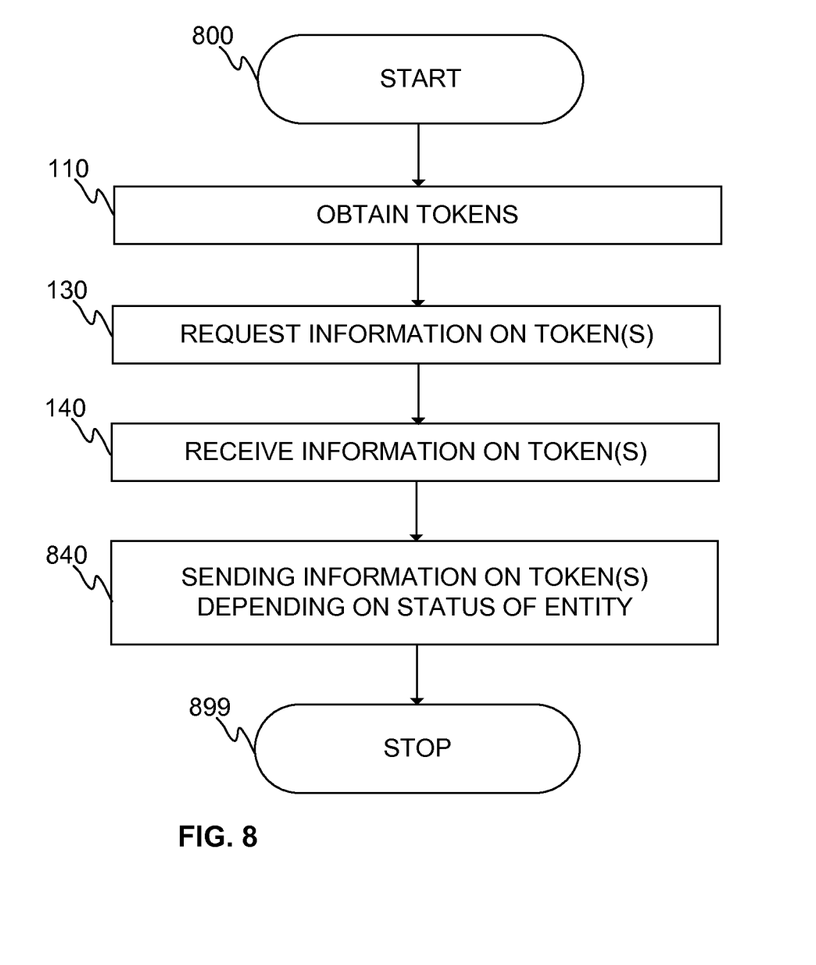
FIG. 8 illustrates a flow diagram of a method in accordance with an embodiment of the present invention.

FIG. 8 illustrates a flow diagram of a method according to an embodiment of the present invention. At 800, referring to a start-up phase, the necessary hardware, such as computing units, and software may be obtained, as well as tasks, such as, setting up communication between computing units, configuring networks, setting up servers, etc. may be performed, whichever of these may be necessary according to the specific embodiment to be implemented. Specific care must be taken that the individual elements and units work together in communication with each other, if necessary.

Steps 110, 130 and 140 are described hereinearlier with respect to FIG. 1.

At 840, sending information from the computing unit of the first entity to the computing unit of the second entity depending on the status of the first entity may take place. The sending may be performed as a part of the token-based information exchange, for example, based on the request from the second entity or automatically as a response for the requesting or the receiving at steps 130 and 140, respectively.

At 899, the method execution is ended. The method may be executed continuously or in certain intervals, or on a request. The method may also be executed only once or only a few times.

According to an embodiment, status of the entity may be anonymous or registered as described hereinearlier. In case of anonymous entity or user, privacy may be a primary concern. In case of registered entity or user, such as having a user account or accepting (Internet) cookies or be recognizable in any way, privacy may be less of a concern.

According to an embodiment, the sending comprises sending different information on one or several tokens 205, 205A, 205B with respect to the stored information on previously sent information on said one or several tokens 205, 205A, 205B in case the status of the entity is anonymous. Different information may be sent by selection the token or tokens randomly, or storing in memory the last sent tokens with respect to the service in question. Privacy is thus enhanced because the service cannot identify the entity or user so easily.

According to an embodiment, the sending comprises sending the same information on one or several tokens 205, 205A, 205B with respect to the stored information on previously sent information on said one or several tokens 205, 205A, 205B in case the status of the entity is registered. By disclosing the same information to the particular service each time, the entity or user avoids or at least reduces the risk that the service could collect information related to the tokens of the entity or user, for example, by keeping record of the tokens sent or disclosed by the particular entity or user.

Alternatively or in addition, if the user or the item has been registered to a service, or the like, the anonymity is by default lost, then the system may be configured to disclose same tokens to the same service, or the like, in as long as the token(s) still exists in the token set of the user. The token(s) may be randomly selected from the token set of the user or the item, or, in case of embodiments utilizing clustering of the tokens (e.g. in accordance with FIG. 1), the selection may be done from within the active cluster. Alternatively, the tokens can be ranked in order of by the degree about how well a token represents the cluster, and selected in that order; best representation being in the center of the cluster by e.g. means of smallest average distance to all other tokens in the cluster, or measuring how far from the center of a cluster a token is by utilizing known methods of calculating the distance. It may thus be advantageous from the privacy point of view to disclose same token(s) over and over again to the same service in case of a registered user.

Figure 9:
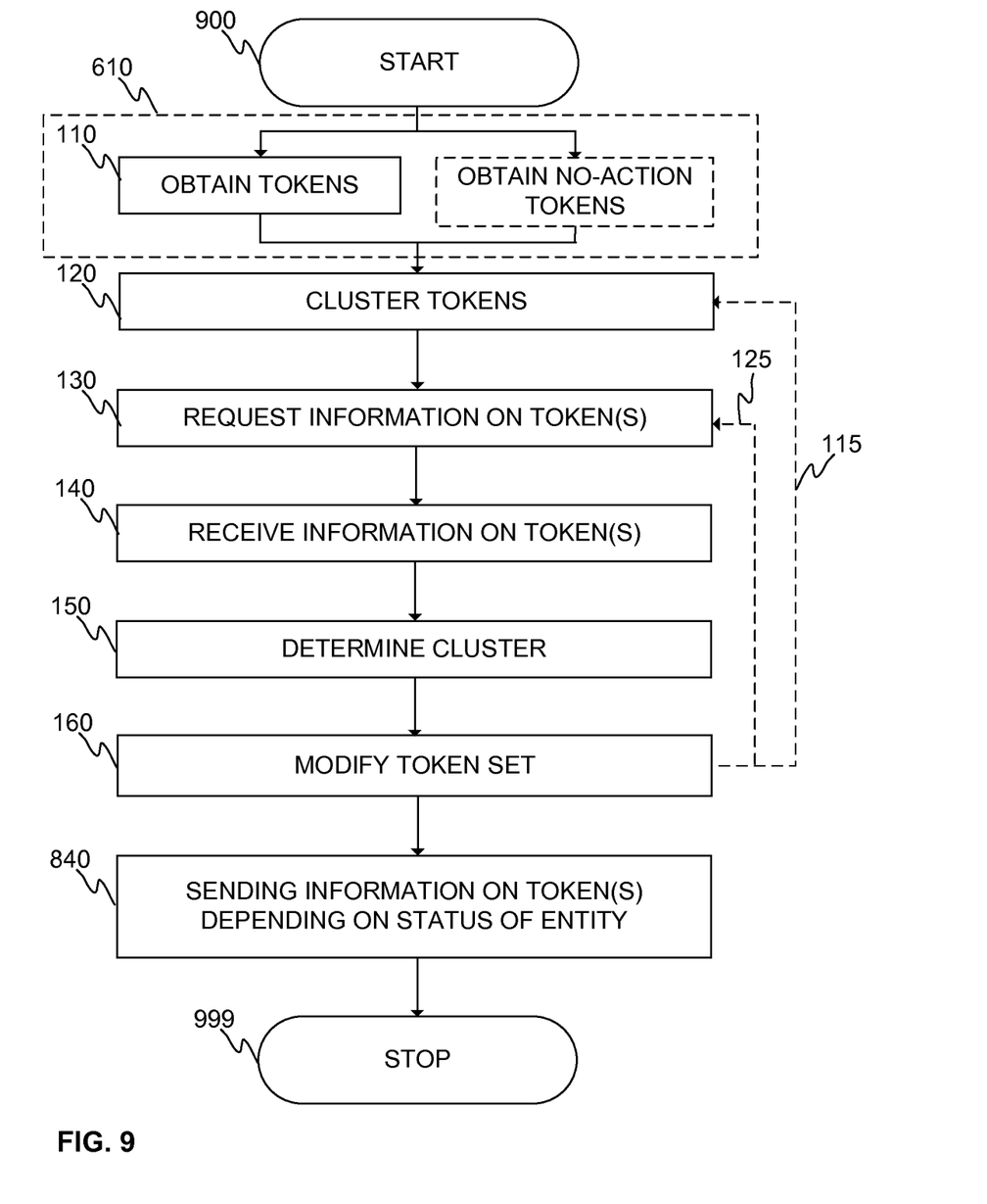
FIG. 9 illustrates a flow diagram of a method in accordance with an embodiment of the present invention utilizing clustering of tokens.

FIG. 9 further illustrates a flow diagram of a method according to an embodiment of the present invention according to which clustering is used. At 900, referring to a startup phase, the necessary hardware, such as computing units, and software may be obtained, as well as tasks, such as, setting up communication between computing units, configuring networks, setting up servers, etc. may be performed, whichever of these may be necessary according to the specific embodiment to be implemented. Specific care must be taken that the individual elements and units work together in communication with each other, if necessary.

Steps 110, 115, 120, 125, 130, 140, 150 and 160 are described hereinearlier with respect to FIG. 1. Step 840 is described in connection with FIG. 8. According to an embodiment, the token or tokens sent, whether the same or different (e.g. anonymous or registered entity or user), may be chosen from the active cluster or some other cluster. Furthermore, in case of sending always different tokens, these tokens may be chosen from different clusters. According to still another embodiment, the token may always be chosen from the same cluster but being somewhat different tokens. The hamming distance of the token in one cluster may be short and, thus, privacy is maintained although the tokens sent are not completely the same.

Features described in the preceding description may be used in combinations other than the combinations explicitly described. Although functions have been described with reference to certain features, those functions may be performable by other features whether described or not. Although features have been described with reference to certain embodiments, those features may also be present in other embodiments whether described or not.

The invention claimed is:

1. A method for token-based information exchange between a computing unit of a first entity and a computing unit of at least one second entity, wherein the method comprises:
    obtaining a token set including at least one token associated with the first entity and a token set including at least one token associated with the at least one second entity, wherein each entity is associated with at least one token set,
    clustering the token set associated with the first entity by dividing the token set into at least two clusters for forming at least two token subsets corresponding to said at least two clusters,
    requesting information on one or several tokens associated with the at least one second entity from the computing unit of the at least one second entity,
    receiving information on said one or several tokens from the computing unit of the at least one second entity, wherein the information is received from a primary cluster associated with the at least one second entity, wherein the primary cluster is a cluster comprising a previously utilized cluster during a previous token-based information exchange event,
    determining an active cluster associated with the first entity, the active cluster being one of said at least two clusters,
    modifying the token subset associated with the determined active cluster of the first entity at least partly with information on the received one or several tokens associated with the second entity, and
    limiting the number of tokens per information exchange to at least 1 token up to 5% of the tokens in the primary cluster.

2. The method of claim 1, wherein the clustering further comprises clustering the token set associated with the at least one second entity.

3. The method of claim 1, wherein the determining comprises determining the active cluster based on the received information on said one or several tokens or based on the previously determined active cluster.

4. The method of claim 1, wherein the clustering comprises calculating mean value, standard deviation and linear correlation of the token set or token subset or sets or sub sets.

5. The method of claim 4, wherein the clustering comprises selecting the closest tokens as seed centroids for clustering, wherein the seed centroids are the closest tokens to the points having distance equal to the standard deviation from the mean value.

6. The method of claim 1, wherein the obtaining further comprises
    determining an inactivity period,
    obtaining a no-action token set including at least one token associated with the at least one second entity,
    storing said information on said one or several tokens in connection with the at least one second entity,
    detecting occurrence of the inactivity period during which no token-based information exchange between the computing units of the first and at least one second entities has taken place after said requesting information on said one or several tokens, and modifying the no-action token set associated with the at least one second entity at least partly with stored information on the received one or several tokens associated with the second entity.

7. The method of claim 6, wherein the inactivity period is determined to be a fixed duration, or a statistical value based on all observed inactivity periods of a particular user or on observed inactivity periods of all users.

8. The method of claim 1, comprising sending information on one or several tokens in response to the requesting depending on a status of the first entity, wherein a stored information on previously sent information on said one or several tokens is being utilized in the sending of said information.

9. The method according to claim 8, wherein the status of the first entity is anonymous or registered.

10. The method according to claim 8, wherein the sending comprises sending different information on one or several tokens with respect to the stored information on previously sent information on said one or several tokens in case the status of the entity is anonymous.

11. The method according to claim 8, wherein the sending comprises sending the same information on one or several tokens with respect to the stored information on previously sent information on said one or several tokens in case the status of the entity is registered.

12. A computing unit for token-based information exchange with at least one other computing unit of at least one second entity, wherein the computing unit comprises communication means for exchanging information with at least one other computing unit, memory unit for storing portions of computer code containing instructions to be executed by a processing unit, and wherein the processing unit is configured to:

obtain a token set including at least one token associated with the first entity and a token set including at least one token associated with the at least one second entity, wherein each entity is associated with at least one token set, cluster the token set associated with the first entity by dividing the token set into at least two clusters for forming at least two token subsets corresponding to said at least two clusters, request information on one or several tokens associated with the at least one second entity from the computing unit of the at least one second entity, receive information on said one or several tokens from the computing unit of the at least one second entity, wherein the information is received from a primary cluster associated with the at least one second entity, wherein the primary cluster is a cluster comprising a previously utilized cluster during a previous token-based information exchange event, determine an active cluster associated with the first entity, the active cluster being one of said at least two clusters, modify the token subset associated with the determined active cluster of the first entity at least partly with information on the received one or several tokens associated with the second entity, and limit the number of tokens per information exchange to at least 1 token up to 5% of the tokens in the primary cluster.

13. A system comprising a computing unit of a first entity, wherein the computing unit of the first entity comprises a hardware processor, a computing unit of at least one second entity, the computing units of said entities are configured to exchange information utilizing tokens, wherein, in the system token sets are configured to be obtained by said computing units for associating with said entities, said token sets of the computing unit of the first entity is configured to be clustered by dividing the token sets into at least two clusters, by the respective computing unit for forming at least two token subsets corresponding to said at least two clusters, information on one or several tokens associated to the at least one second entity from the computing unit of the at least one second entity is configured to be requested, wherein the information is received from a primary cluster associated with the at least one second entity, wherein the primary cluster is a cluster comprising a previously utilized cluster during a previous token-based information exchange event, information on the one or several tokens from the computing unit of the at least one second entity is configured to be received by the computing unit of the first entity, one of the clusters of the first entity is configured, by the computing unit of the first entity, to be determined as an active cluster, the active cluster being one of said at least two clusters, the token subset associated with the active cluster of to the first entity at least partly with information of the received token associated to the at least one second entity are configured to be modified by the computing unit of the first entity, the modified token subset is configured to be utilized in a service, and a number of tokens per information exchange is limited to at least 1 token up to 5% of the tokens in the primary cluster.

* * * * *